United States Patent
Ma et al.

(10) Patent No.: US 8,675,582 B2
(45) Date of Patent: Mar. 18, 2014

(54) METHOD, APPARATUS, AND SYSTEM FOR SETTING UP RADIO BEARER

(75) Inventors: Hui Ma, Shenzhen (CN); Yinghui Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 13/235,044

(22) Filed: Sep. 16, 2011

(65) Prior Publication Data

US 2012/0009931 A1 Jan. 12, 2012

Related U.S. Application Data

(63) Continuation of application No. PCT/CN2009/070838, filed on Mar. 17, 2009.

(51) Int. Cl.
*H04W 4/00* (2009.01)

(52) U.S. Cl.
USPC ...... 370/329; 370/327; 370/328; 370/395.21; 370/395.31; 370/432; 455/450; 455/445; 455/520

(58) Field of Classification Search
USPC ............. 455/450, 445, 520, 524, 560, 561; 370/327, 328, 395.21, 395.31, 395.43, 370/432, 329
See application file for complete search history.

(56) References Cited

U.S. PATENT DOCUMENTS

| 6,539,022 B1 * | 3/2003 | Virgile .......................... 370/401 |
| 6,633,628 B1 | 10/2003 | Linder et al. |
| 2005/0147061 A1 | 7/2005 | Francoeur et al. |
| 2005/0192021 A1 | 9/2005 | Lee et al. |
| 2008/0075178 A1 | 3/2008 | Lappetelainen et al. |
| 2008/0198763 A1 | 8/2008 | Fischer et al. |
| 2009/0232160 A1 * | 9/2009 | Wu et al. ...................... 370/468 |
| 2010/0103863 A1 * | 4/2010 | Ulupinar et al. ............... 370/315 |

FOREIGN PATENT DOCUMENTS

| CN | 1658542 A | 8/2005 |
| CN | 1910833 A | 2/2007 |
| CN | 101155395 A | 4/2008 |
| CN | 101171773 A | 4/2008 |
| CN | 101257705 A | 9/2008 |
| EP | 1628442 A1 | 2/2006 |

(Continued)

OTHER PUBLICATIONS

Written Opinion of the International Searching Authority issued in corresponding PCT Patent Application No. PCT/CN2009/070838, mailed Dec. 24, 2009.

(Continued)

*Primary Examiner* — Marcos Torres
(74) *Attorney, Agent, or Firm* — Brinks Gilson & Lione

(57) ABSTRACT

The present invention relates to the field of wireless communications technologies and discloses a method, an apparatus, and a system for setting up a Radio Bearer (RB) in order to enable end-to-end RB setup from a User Equipment (UE) to an evolved NodeB (eNB) in a relay network system. The method includes: receiving a first RB setup message sent by an eNB; performing RB setup preprocessing according to the first RB setup message; generating a second RB setup message according to a result of the RB setup preprocessing; and sending the second RB setup message to a UE, notifying the UE to set up an RB on an access link. The present invention is mainly applicable to the relay network system.

8 Claims, 13 Drawing Sheets

(56) References Cited

FOREIGN PATENT DOCUMENTS

| WO | WO 2005067172 A1 | 7/2005 |
|----|------------------|--------|
| WO | WO 2006118426 A1 | 11/2006 |
| WO | WO 2008/106880 A1 | 9/2008 |

OTHER PUBLICATIONS

International Search Report issued in corresponding PCT Patent Application No. PCT/CN2009/070838, mailed Dec. 24, 2009.

Extended European Search Report issued in corresponding European Patent Application No. 09841694.4, mailed Apr. 5, 2012.

Baseline Document for Draft Standard for Local and Metropolitan Area Network, "Multihop Relay Specification" Part 16: Air Interface for fixed and Mobile Broadband Wireless Access Systems. 802.16j-06-026r2, Feb. 9, 2007.

Office Action issued in corresponding Chinese Patent Application No. 200980116582.7, mailed Apr. 2, 2013.

\* cited by examiner

METHOD, APPARATUS, AND SYSTEM FOR SETTING UP RADIO BEARER

CROSS-REFERENCE TO RELATED APPLICATIONS

This application is a continuation of International Application No. PCT/CN2009/070838, filed on Mar. 17, 2009, which is hereby incorporated by reference in its entirety.

FIELD OF THE INVENTION

The present invention relates to the field of wireless communications technologies, and in particular, to a technology for setting up a Radio Bearer (RB).

BACKGROUND OF THE INVENTION

In a wireless network, a terminal communicates with one or more Core Networks (Core Networks, CNs) via a Radio Access Network (Radio Access Network, RAN). The coverage area of the RAN is divided to geographic cells and each cell is served by one Evolved NodeB (eNB). This means that the eNB provides radio coverage for the served cell.

To increase the coverage of an eNB and guarantee the user performance at a cell edge, a Relay Station (RS) is introduced. The RS communicates with the eNB through an air interface, and processes the signal once or multiple times or forwards the signal directly, until the radio signal is sent to the terminal. Because an RS may be connected to a network without any cable, the cost for constructing an RS is much lower than that for an eNB if the same system performance is provided.

In a prior communications system, to set up a Radio Bearer (Radio Bearer, RB), a User Equipment (User Equipment, UE) first sets up a Radio Resource Control (Radio Resource Control, RRC) connection with an eNB. Then, the eNB sends a Radio Bearer Setup (Radio Bearer Setup, RB Setup) message to the UE. The message carries configuration parameters such as the UE, the CN, a transport channel, a physical channel, and a radio resource. Then, the UE completes the RB setup according to the configuration parameters and sends a Radio Bearer Complete message to the eNB, where the Radio Bearer Complete message carries configuration parameters such as the UE and the RB.

With the introduction of the RS, a one-hop link between the UE and the eNB is changed to a multi-hop link, where the RS is deployed between the UE and the eNB. As a result, end-to-end RB setup between the UE and the eNB cannot be implemented.

SUMMARY OF THE INVENTION

Embodiments of the present invention provide a method, an apparatus, and a system for setting an RB in order to enable end-to-end RB setup from a UE to an eNB in a relay network system.

Embodiments of the present invention adopt the following technical solutions:

A method for setting up an RB includes:
receiving a first RB setup message sent by an eNB;
performing RB setup preprocessing according to the first RB setup message;
generating a second RB setup message according to a result of the RB setup preprocessing; and
sending the second RB setup message to a UE, notifying the UE to set up an RB on an access link.

A method for setting up an RB includes:
receiving a first RB setup message sent by an eNB;
performing RB setup preprocessing according to the first RB setup message;
generating a second RB setup message according to a service request of a UE; and
sending the second RB setup message to the UE, notifying the UE to set up an RB on an access link.

An RS includes:
a message receiving unit, configured to receive a first RB setup message sent by an eNB;
a message processing unit, configured to perform RB setup preprocessing according to the first RB setup message;
a message generating unit, configured to generate a second RB setup message according to the first RB setup message; and
a message sending unit, configured to send the second RB setup message to a UE, notifying the UE to set up an RB on an access link.

An RS includes:
a message receiving unit, configured to receive a first RB setup message sent by an eNB;
a message processing unit, configured to perform RB setup preprocessing according to the first RB setup message;
a message generating unit, configured to generate a second RB setup message according to a service request of a UE; and
a message sending unit, configured to send the second RB setup message to the UE, notifying the UE to set up an RB on an access link.

With the method, and apparatus for setting up an RB according to the embodiments of the present invention, when an RS exists in the system, the RS performs RB setup preprocessing according to a first RB setup message sent by an eNB, generates a second RB setup message according to the preprocessing result, and sends the second RB setup message to a UE, so that the UE sets up an RB according to the second RB setup message. Therefore, after the RS is introduced, an end-to-end RB can be set up between the eNB and the UE with the technical solutions of the embodiments of the present invention.

An embodiment of the present invention further provides an eNB. The eNB includes a message receiving unit, a message processing unit, a first message sending unit, and a second message sending unit, where:
the message receiving unit is configured to receive a service request initiated by a UE;
the message processing unit is configured to: according to the service request received by the message receiving unit, judge whether on a relay link there is already an RB or a combined RB that bears the same service as an RB which is set up according to the service request initiated by the UE; and if there is already an RB or a combined RB that bears the same service as the RB which is set up according to the service request initiated by the UE, notify the first message sending unit to send a first RB setup message; or if there is no RB or combined RB that bears the same service as the an RB which is set up according to the service request initiated by the UE, notify the second message sending unit to send a first RB setup message;
the first message sending unit is configured to send a first RB setup message, where the message is an RB setup reconfiguration message instructing an RS to reconfigure an existing RB according to the RB setup reconfiguration message; or the message is an indication message instructing the RS to use an existing RB for the service request of the UE and update a mapping table; and the second message sending unit is configured to send a first RB setup message, where the message is an RB setup message or a combined RB setup message instructing the RS to set up a new RB or new combined RB for the service request of the UE according to the message.

Through the eNB provided by the embodiment of the present invention, it may be judged whether the service required by the service request of the UE is the same as a service borne over an existing RB and modify or use the existing RB, therefore reducing signaling overhead and saving network resources.

BRIEF DESCRIPTION OF THE DRAWINGS

To describe the technical solutions in the embodiments of the present invention more clearly, the following outlines the accompanying drawings required in the description of the embodiments. Apparently, the accompanying drawings illustrate only some exemplary embodiments of the present invention, and persons skilled in the art can derive other drawings from the accompanying drawings without creative efforts.

DETAILED DESCRIPTION OF THE EMBODIMENTS

The technical solutions provided in the embodiments of the present invention are described clearly and completely with reference to the accompanying drawings in the following. Apparently, the embodiments are only exemplary embodiments of the present invention and the present invention is not limited to such embodiments. Based on the embodiments of the present invention, those skilled in the art can derive other embodiments without creative efforts and such other embodiments all fall within the protection scope of the present invention.

For description purposes, in the embodiments of the present invention, a link between a UE and an RS is referred to as an access link, and the link between the RS and an eNB is referred to as a relay link.

Figure 1:
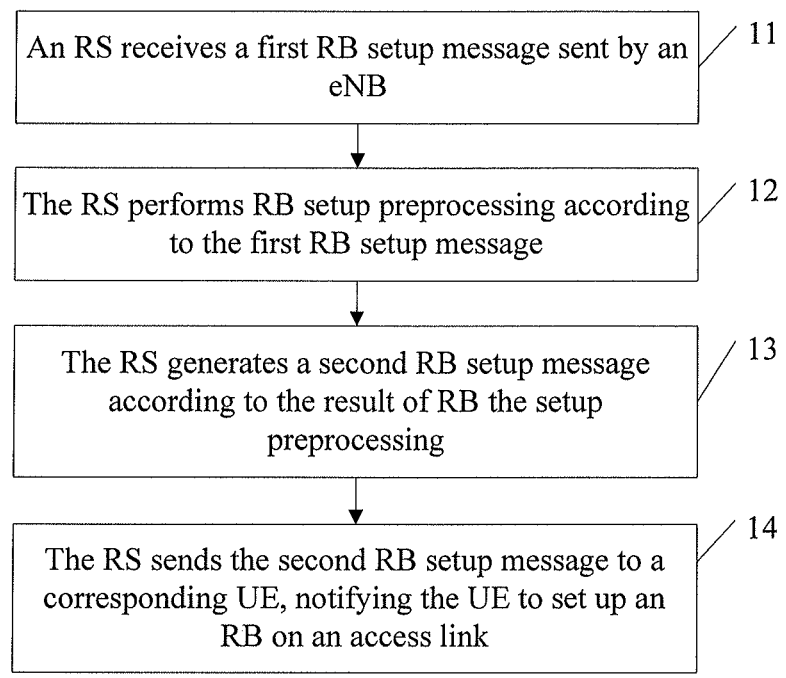
FIG. 1 is a flowchart of a method for setting up an RB according to a first embodiment of the present invention.

To enable end-to-end RB setup between a UE and an eNB after an RS is introduced, the first embodiment of the present invention provides a method for setting up an RB, as shown in FIG. 1, including the following steps:

Step 11: The RS receives a first RB setup message sent by the eNB.

Step 12: The RS performs RB setup preprocessing according to the first RB setup message.

Step 13: The RS generates a second RB setup message according to a result of the RB setup preprocessing.

Step 14: The RS sends the second RB setup message to a corresponding UE, notifying the UE to set up an RB on an access link.

From the above description, it is apparent that, in the method provided by the first embodiment of the present invention, when an RS exists in the system, the RS performs RB setup preprocessing according a first RB setup message sent by the eNB, generates a second RB setup message according to the preprocessing result, and sends the message to the UE, so that the UE can set up an RB according to the second RB setup message. Therefore, after the RS is introduced, an end-to-end RB can be set up between the eNB and the UE with the technical solution of the embodiment of the present invention.

Specific implementations of the method for setting up an RB according to the embodiment of the present invention are described in detail with reference to different application scenarios.

In the second embodiment of the present invention, an RB is set up for a UE directly according to a service request of the UE.

Figure 2:
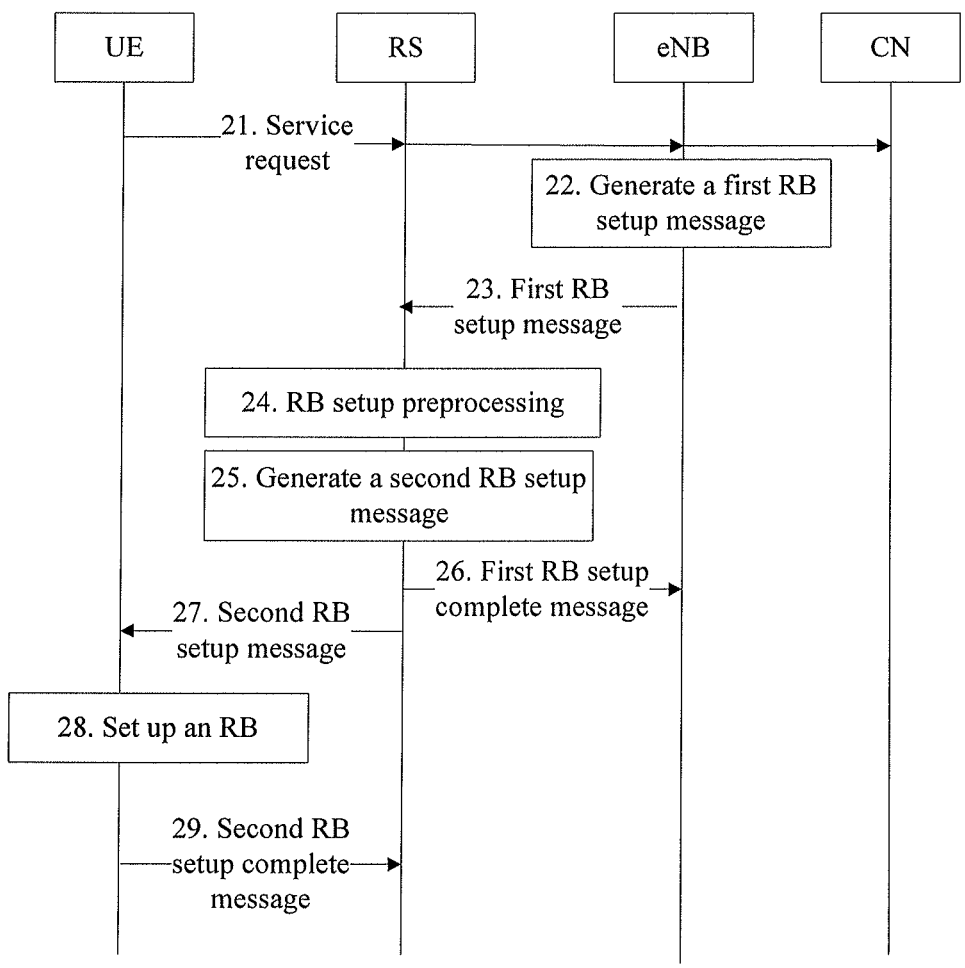
FIG. 2 is a flowchart of a method for setting up an RB according to a second embodiment of the present invention.

As shown in FIG. 2, a method for setting up an RB according to the second embodiment of the present invention includes the following steps:

Step 21: A UE sends a service request to a CN via an RS (Relation Station, RS) and an eNB.

For example, the UE sends a service request to the RS; the RS transfers the service request to the eNB transparently; and the eNB forwards the service request to the CN. In this way, the service request is sent from the UE to the CN.

Step 22: The eNB generates a first RB setup message according to the service request.

In this step, the eNB does not judge related features of the service request, but triggers the generation of the first RB setup message upon receiving the service request. This means, the trigger condition for generating the RB setup message is the service request but is irrelevant to the specific content of the service request.

Step 23: The eNB sends the first RB setup message to the RS. The first RB setup message includes, for example, RB configuration information including configuration parameters such as the UE, the RS, the CN, a transport channel, a physical channel, and a radio resource, or any combination of the configuration parameters.

Step 24: The RS performs RB setup preprocessing according to the first RB setup message. Specifically, for example, the RS completes RB setup related configuration on a relay link. Or further, the RS obtains parameters of the RB required to be set up on an access link.

Step 25: The RS generates a second RB setup message according to the preprocessing result. The second RB setup message may include RB configuration information, for example, configuration parameters such as the UE, CN, transport channel, physical channel, and radio resource, or any combination of the configuration parameters.

Step 26: The RS sends a first RB setup complete message to the eNB according to the first RB setup message.

Step 27: The RS sends the second RB setup message to the UE, notifying the UE to set up an RB.

Step 28: The UE performs RB setup related configuration on the access link according to the second RB setup message, and sets up an RB on the access link.

Step 29: The UE sends a second RB setup complete message to the RS and the RB setup process is completed.

In the second embodiment of the present invention, step 26 may be executed after step 24 or step 29.

According to the second embodiment of the present invention, it is apparent that the RS sets up a new RB for a service request of each UE. This means, when an RS exists in the system, the RS performs RB setup preprocessing according to a first RB setup message sent by the eNB. Then, the RS generates a second RB setup message according to the preprocessing result and sends the message to the UE. In this way, the UE can set up an RB according to the second RB setup message. Therefore, after the RS is introduced, an end-to-end RB can be set up between the eNB and the UE with the technical solution of the embodiment of the present invention.

In addition, as seen from the second embodiment, the RS sets up a new RB for the service request of each UE, despite whether on the relay link there is already an RB that bears the same service as an RB which is set up according to the service request of the UE, for example, an RB with the same Quality of Service (Quality of Service, QoS) as an RB which is set up according to the service request of the UE. In the third embodiment and fourth embodiment, an RB is set up for a UE, where different UEs have the same service request. The service requests are the same means that the service requests have a same service feature, such as the same QoS. This is not further explained in the following embodiments of the present invention.

Figure 3A:
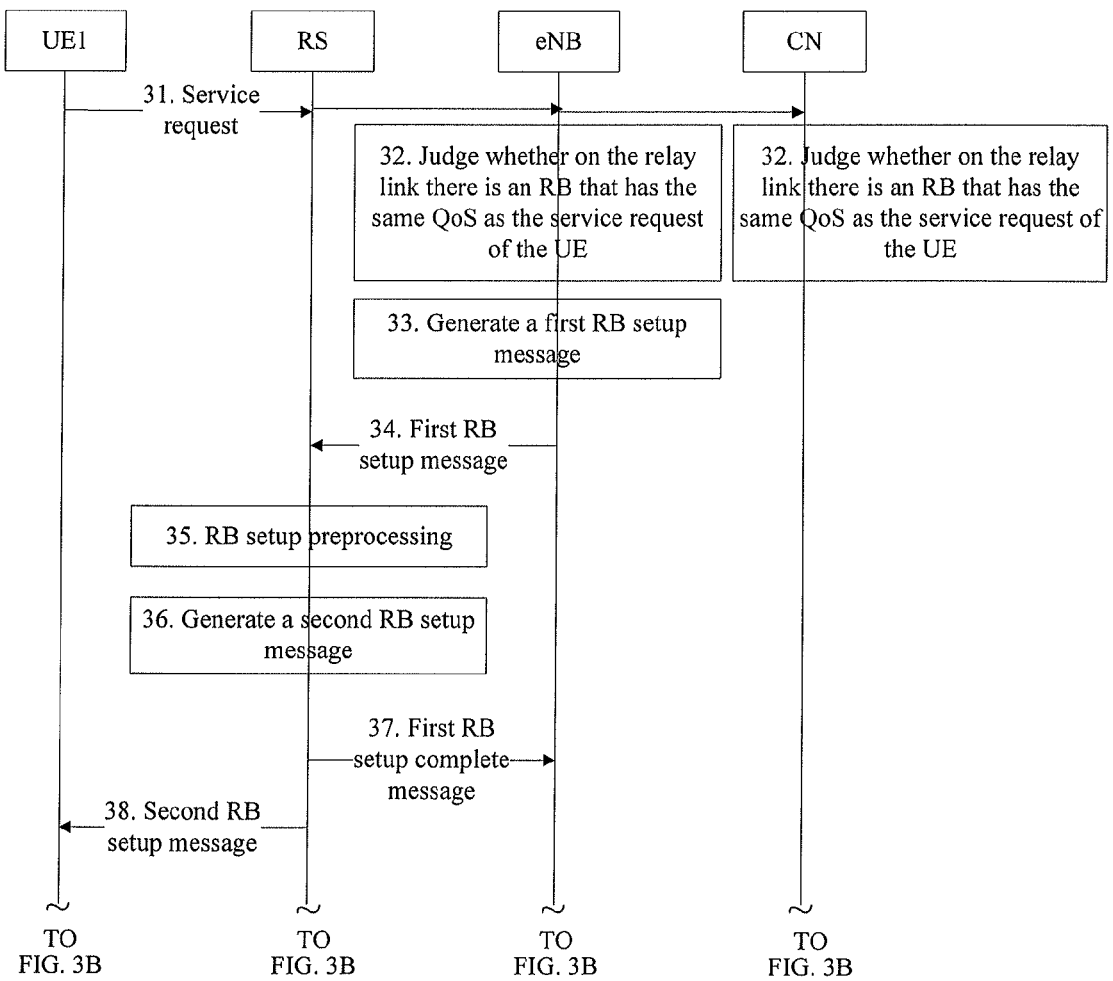
FIG. 3A~FIG. 3B is a flowchart of a method for setting up an RB according to a third embodiment of the present invention.
Figure 3B:
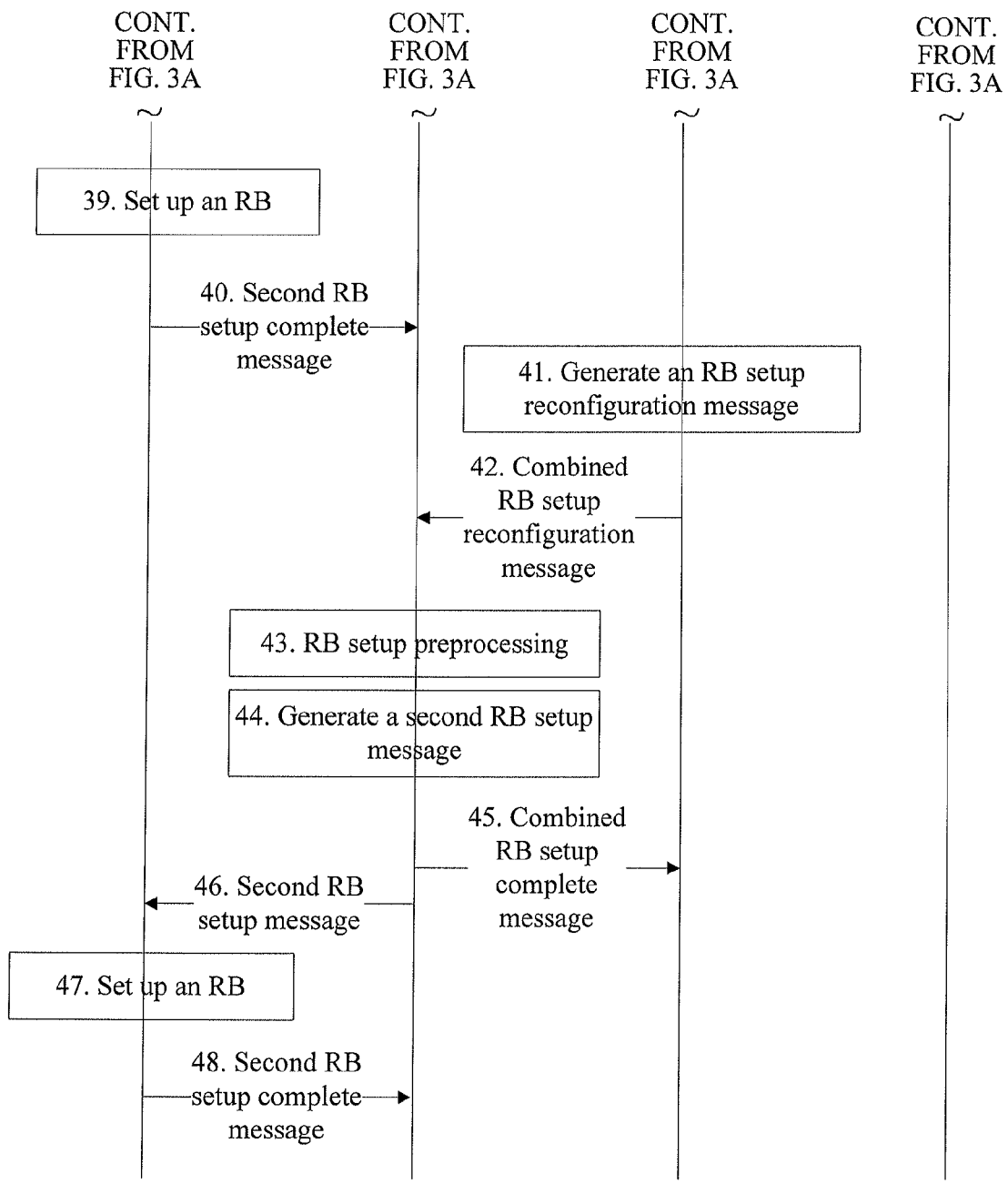

As shown in FIG. 3A~FIG. 3B, a method for setting up an RB according to the third embodiment of the present invention includes the following steps:

Step 31: A UE sends a service request to a CN via an RS and an eNB.

The implementation of this step is like that of step 21 in the second embodiment of the present invention.

Step 32: According to the service request, the eNB or CN judges whether on a relay link there is an RB that has the same QoS as an RB which is set up according to the service request of the UE. If the CN makes the judgment, the CN sends the judgment result to the eNB.

If there is no RB that has the same QoS as the RB which is set up according to the service request of the UE, steps 33-40 are executed; if there is already an RB that has the same QoS as the RB which is set up according to the service request of the UE, steps 41-49 are executed.

Step 33: The eNB generates a first RB setup message according to the judgment result of the CN or the judgment result of the eNB.

Step 34: The RS receives the first RB setup message sent by the eNB, where the first RB setup message includes a request for setting up an RB for at least one UE and a resource allocated to the at least one UE. In the embodiment of the present invention, step 34 is preceded by a judgment step. Specifically, the judgment step is to judge whether service requests initiated by different UEs are the same under a given condition. The given condition is, for example, a period of time and the judgment step is to judge whether the service requests initiated by different UEs are the same within the given period of time. Therefore, according to the information included in the first RB setup message, the following two circumstances may be differentiated:

In the first circumstance, when the first RB setup message includes a request for setting up an RB for one UE and a resource allocated to the UE, the above judgment step judges that the service requests initiated by different UEs are different. That is, when the eNB or CN judges that the service requests initiated by different UEs are different, the first RB setup message sent by the eNB to the RS includes only the request for setting up an RB for one UE and the resource allocated to the UE. For example, when the service request initiated by UE 1 is service request 1, the service request initiated by UE 2 is service request 2, and service request 1 is different from service request 2, the eNB sends two first RB setup messages to the RS, namely, first RB setup message 1 and first RB setup message 2. The first RB setup message 1 includes the request for setting up an RB for UE 1 and the resource allocated to UE 1; the first RB setup message 2 includes the request for setting up an RB for UE 2 and the resource allocated to UE 2. Similar circumstances in the following embodiments of the present invention are not further explained.

The first RB setup message in the embodiment of the present invention is specifically an RB setup message in the prior art. The first RB setup message includes configuration parameters such as the UE, the RS, the CN, the RB, a transport channel, a physical channel, and a radio resource.

In the second circumstance, when the first RB setup message includes a request for setting up RBs for at least two UEs that initiate the same service request and resources allocated to the at least two UEs, it is judged, based on the above judgment step, that the service requests initiated by the at least two UEs are the same. For example, within a period of time, UE 1 initiates service request 1 and UE 2 initiates service request 1, and the eNB or CN judges that the service requests initiated by UE 1 and UE 2 are the same in the period. The eNB sends a first RB setup message 1 to the RS. The message includes the request for setting up RBs for UE 1 and UE 2 and the resources allocated to UE 1 and UE 2. In this circumstance, the first RB setup message is specifically a combined RB setup message. The combined RB setup message includes configuration parameters such as the UE, RS, CN, RB, transport channel, physical channel, and radio resource. The radio resource is, for example, a common resource block allocated to the at least two UEs.

Step 35: The RS performs RB setup preprocessing according to the first RB setup message.

With respect to the first circumstance in step 34, the RB setup preprocessing of the RS specifically includes: the RS performs RB setup related configuration according to the first RB setup message to set up an RB with the eNB, and then according to the information included in the first RB setup message, creates a mapping table between the RB and an RB on an access link.

With respect to the second circumstance in step 34, the RB setup preprocessing of the RS specifically includes: the RS performs RB setup related configuration according to the combined RB setup message to set up a combined RB with the eNB, and then according to the information carried in the combined RB setup message, divides the resources allocated to the UEs and creates a mapping table between the combined RB and RBs on the access link. The mapping table describes the mapping relationship between the RB on the relay link and those on the access link.

Step 36: The RS generates a second RB setup message according to the preprocessing result. The second RB setup message includes RB configuration information, for example configuration parameters such as the UE, CN, transport channel, physical channel, and radio resource, or any combination of the configuration parameters.

Step 37: The RS sends a first RB setup complete message to the eNB according to the first RB setup message.

With respect to the second circumstance in step 34, the first RB setup complete message may be specifically a combined RB setup complete message.

Step 38: The RS sends the second RB setup message to the UE according to the mapping table, notifying the UE to set up an RB.

Step 39: The UE sets up an RB according to the second RB setup message.

Step 40: The RS receives a second RB setup complete message sent by the UE.

Step 37 may be executed after step 36 or step 40.

Step 41: The eNB generates a combined RB setup reconfiguration message according to the judgment result of the CN or the judgment result of the eNB.

Step 42: The RS receives the combined RB setup reconfiguration message from the eNB, where the combined RB setup reconfiguration message carries RB configuration parameters that need be modified, such as the physical channel configuration parameter.

Step 43: The RS performs RB setup preprocessing according to the combined RB setup reconfiguration message.

In the embodiment of the present invention, if the combined RB setup reconfiguration message includes a request for reconfiguring an RB for one UE, this step is specifically executed as follows:

The RS modifies the configuration parameters according to the combined RB setup reconfiguration message. Because there is already an RB that has the same QoS as the RB which is set up according to the service request of the UE, a mapping table has already been created when the RB is set up for another UE. In this step, it is only necessary to update the mapping table between the created RB on the relay link and the RB on the access link.

If the combined RB setup reconfiguration message includes a request for reconfiguring the RBs for at least two UEs that initiate the same service request and the resources allocated to the at least two UEs, this step is specifically executed as follows:

The RS modifies the configuration parameters according to the combined RB setup reconfiguration message and updates the mapping table between the created RB on the relay link and the RB on the access link.

In this step, the process in which the RS updates the mapping table may specifically include a process in which the RS allocates an id to the related UE and then adds the ID to the mapping table.

Step 44: The RS generates a second RB setup message according to the result of the RB setup preprocessing.

Step 45: The RS sends a combined RB setup reconfiguration complete message to the eNB according to the combined RB setup reconfiguration message.

Step 46: The RS sends the second RB setup message to the corresponding UEs according to the updated mapping table, notifying the UEs to set up RBs.

Step 47: The UEs set up RBs according to the second RB setup message.

Step 48: The RS receives second RB setup complete messages respectively sent by the UEs.

Step 45 may be executed after step 43 or step 48.

In the third embodiment of the present invention, when there is no service that has the same QoS as the service required by a UE, a mapping table is created, so that the RB setup process can be simplified when an RB is set up for another UE afterwards; when there is already a service that has the same QoS as the service required by a UE, RB configuration parameters are modified and the created mapping table is updated through a combined RB setup reconfiguration message, so that an RB is set up for the UE without repeating the RB setup process. In this way, the method provided by the embodiment of the present invention increases the efficiency of setting up an RB for a UE.

Figure 4A:
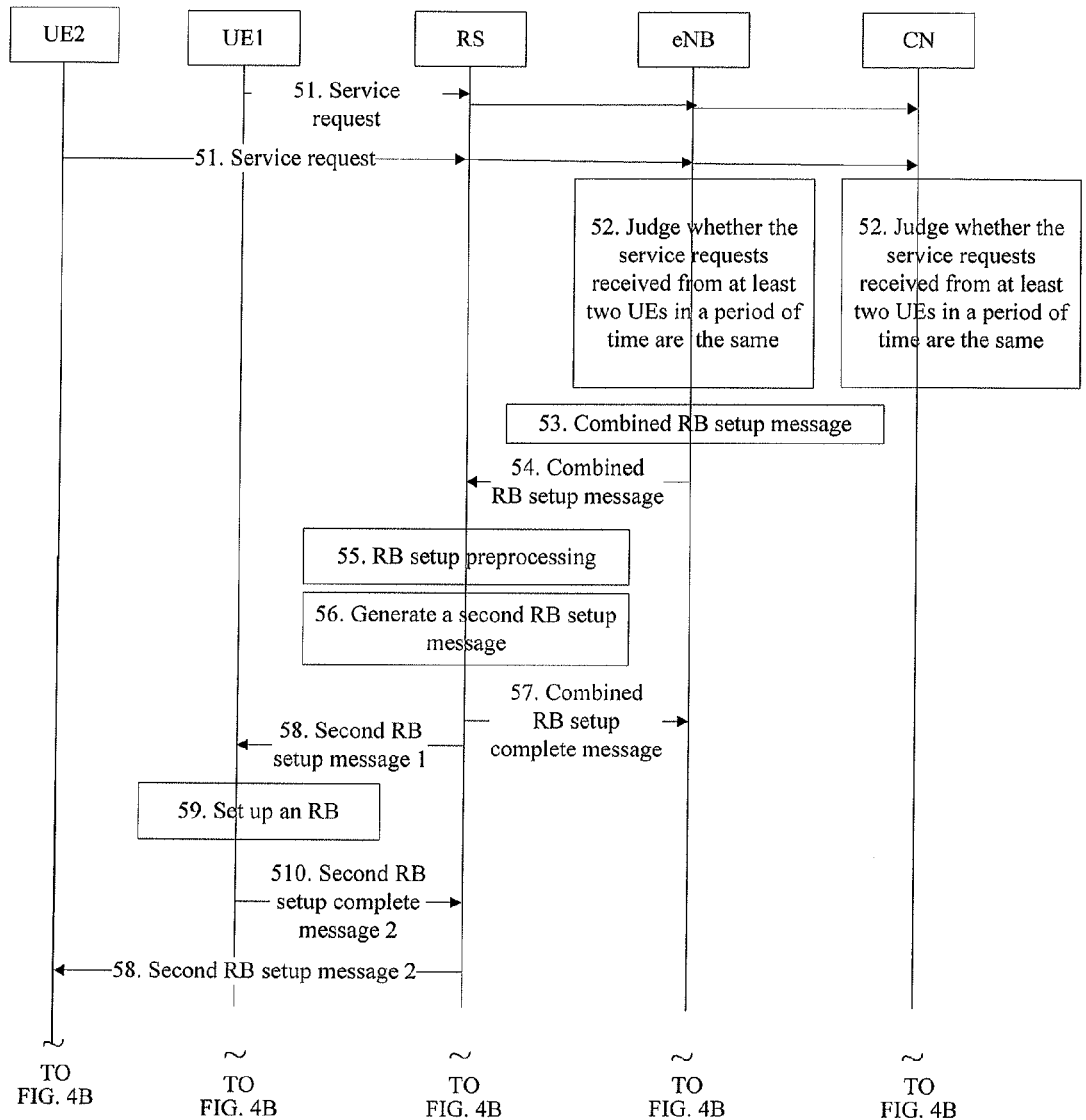
FIG. 4A~FIG. 4B is a flowchart of a method for setting up an RB according to a fourth embodiment of the present invention.
Figure 4B:
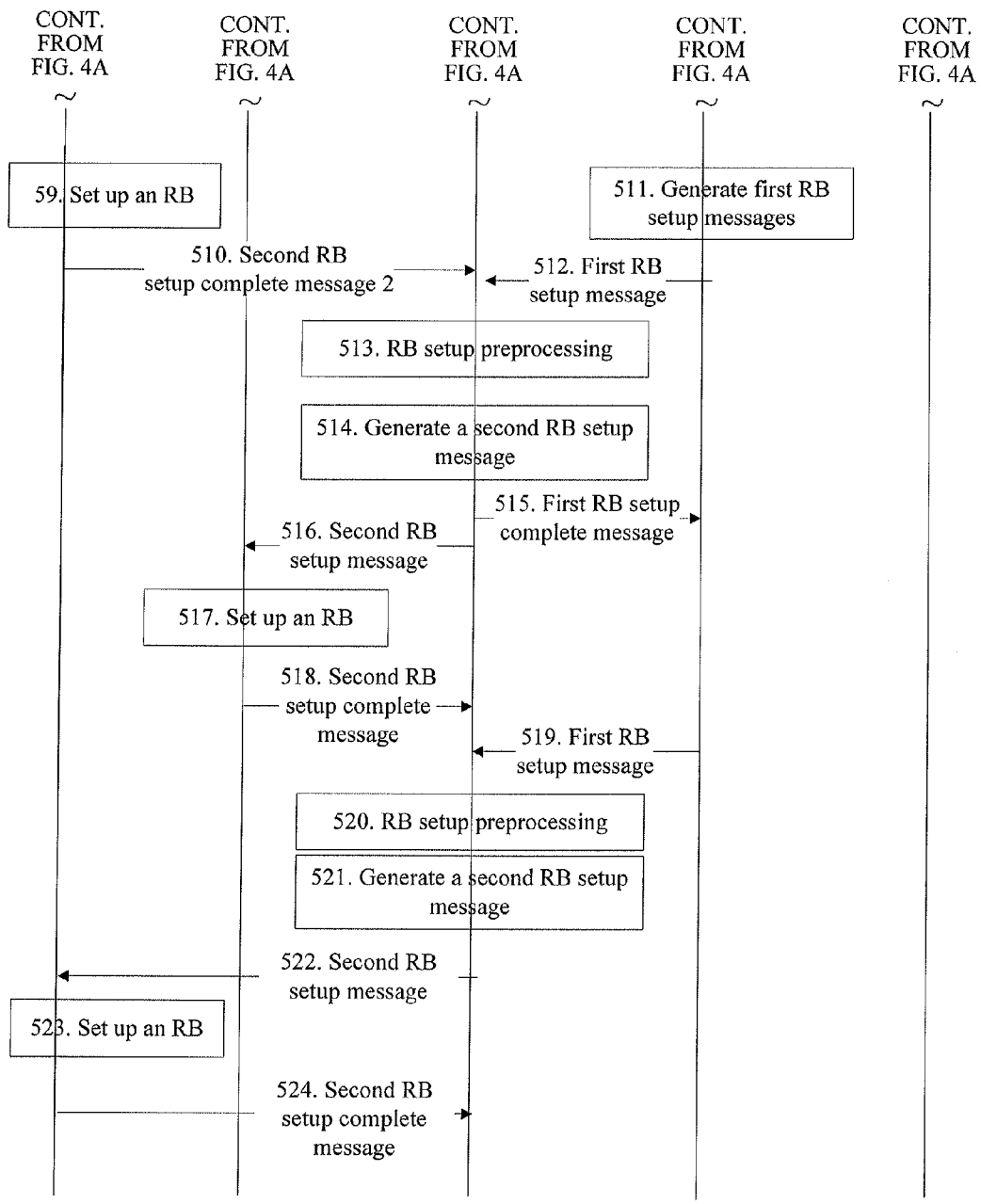

As shown in FIG. 4A~FIG. 4B, a method for setting up an RB according to the fourth embodiment of the present invention includes the following steps:

Step 51: At least two UEs (UE 1 and UE 2 in the embodiment of the present invention) send service requests to a CN via an RS and an eNB.

In this step, the process in which each UE sends a service request to the CN is like that in step 21 in the second embodiment of the present invention.

Further, in step 51, the time of sending service requests by at least two UEs to the CN via the RS and the eNB may be limited to a given period of time.

Step 52: The eNB or CN judges whether the service requests received from the at least two UEs in a period of time are the same; if the service requests are the same, step 53 is executed; or if the service requests are different, step 511 is executed.

In this step, if the CN makes the judgment, the CN sends the judgment result to the eNB.

Step 53: The eNB generates a combined RB setup message.

Step 54: The eNB sends the combined RB setup message to the RS according to the service requests of the UEs, where the combined RB setup message includes configuration parameters such as the UE, the RS, the CN, the RB, a transport channel, and a radio resource. The radio resource is, for example, a common resource block allocated to the at least two UEs.

Step 55: The RS performs RB setup preprocessing according to the combined RB setup message. Specifically, the process in which the RS performs the RB setup preprocessing includes: the RS first completes RB setup related configuration according to the combined RB setup message to set up a combined RB with the eNB, and then according to the information carried in the combined RB setup message, divides the resources allocated to the UEs and creates a mapping table between the combined RB and RBs on an access link. The mapping table describes the mapping relationship between the RB on a relay link and those on the access link.

Step 56: The RS generates a second RB setup message for each UE according to the preprocessing result. The second RB setup message includes RB configuration information, for example, configuration parameters such as the UE, CN, transport channel, physical channel, and radio resource, or any combination of the configuration parameters.

Step 57: The RS sends a combined RB setup complete message to the eNB according to the combined RB setup message.

Step 58: The RS sends the second RB setup message to each related UE according to the mapping table, notifying each UE to set up an RB.

Step 59: The UEs set up RBs respectively according to the second RB setup message.

Step 510: The RS receives second RB setup complete messages respectively sent by the UEs.

Step 511: The eNB generates first RB setup messages for setting up RBs on the relay link respectively for UE 1 and UE 2.

Step 512: The eNB sends the first RB setup message for setting up an RB on the relay link for UE 1 to the RS.

Step 513: The RS performs the RB setup preprocessing according to the first RB setup message. Specifically, for example, the RS completes the RB setup related configuration on the relay link. Or further, the RS obtains parameters of the RB required to be set up on the access link.

Step 514: The RS generates a second RB setup message according to the preprocessing result.

Step 515: The RS sends a first RB setup complete message to the eNB.

Step 516: The RS sends the second RB setup message to UE 1.

Step 517: UE 1 performs the RB setup related configuration on the access link according to the second RB setup message, and sets up an RB between the UE1 and the RS.

Step 518: UE 1 sends a second RB setup complete message to the RS and the RB setup process of UE 1 is completed.

Step 519: The eNB sends the first RB setup message for setting up an RB on the relay link for UE 2 to the RS.

Step 520: The RS performs the RB setup preprocessing according to the first RB setup message. Specifically, for example, the RS completes the RB setup related configuration on the relay link. Or further, the RS obtains the parameters of the RB required to be set up on the access link.

Step 521: The RS generates a second RB setup message according to the preprocessing result.

Step 522: The RS sends the second RB setup message to UE 2.

Step 523: UE 2 performs the RB setup related configuration on the access link according to the second RB setup message, and sets up an RB between the UE2 and the RS.

Step 524: UE 2 sends a second RB setup complete message to the RS and the RB setup process of UE 2 is completed.

When one UE initiates a service request, the processing may be the same as above, but it is unnecessary to judge whether the service requests of UEs are the same, and it is only necessary to set up an RB for the one UE.

The methods according to the second, third, and fourth embodiments of the present invention may be described as a dynamic adjustment of the access link and the relay link. The fifth embodiment of the present invention deals with the dynamic adjustment of the access link and semi-static adjustment of the relay link.

In the fifth embodiment of the present invention, RB setup is triggered by a service request initiated by a UE.

Figure 5A:
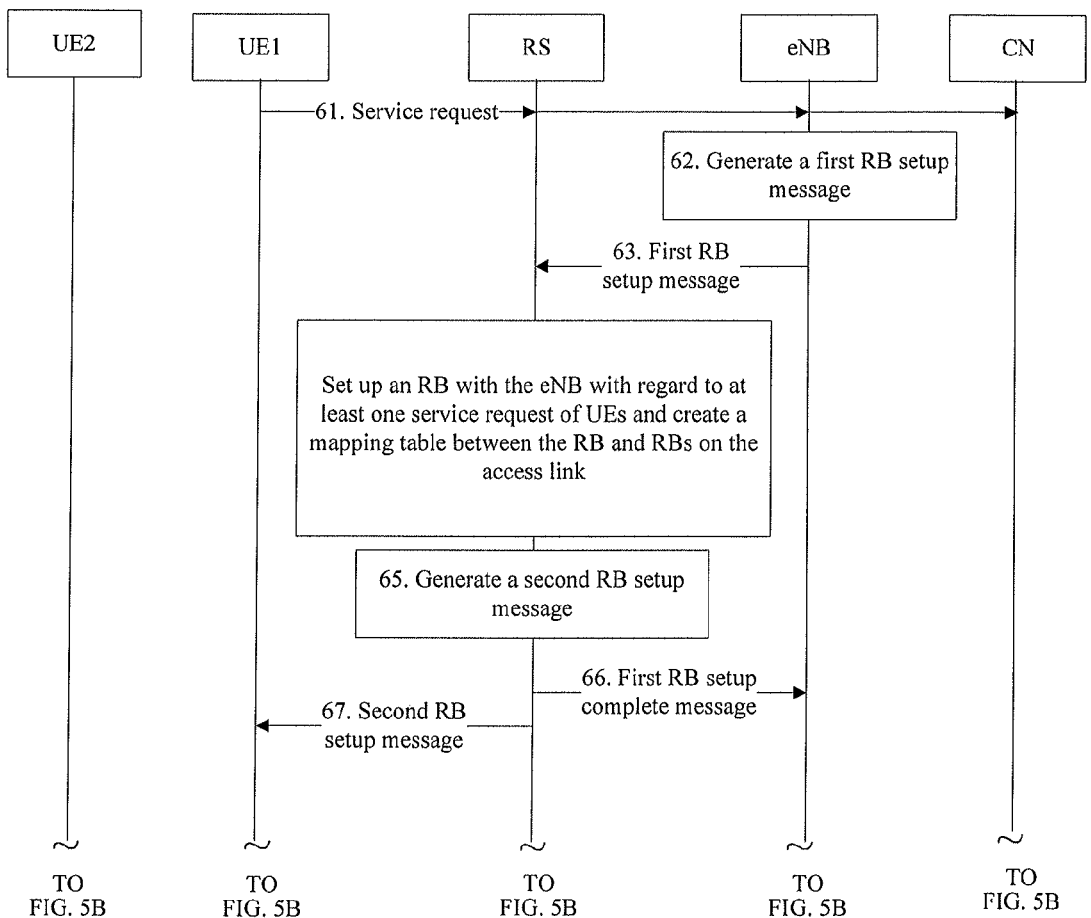
FIG. 5A~FIG. 5B is a flowchart of a method for setting up an RB according to a fifth embodiment of the present invention.
Figure 5B:
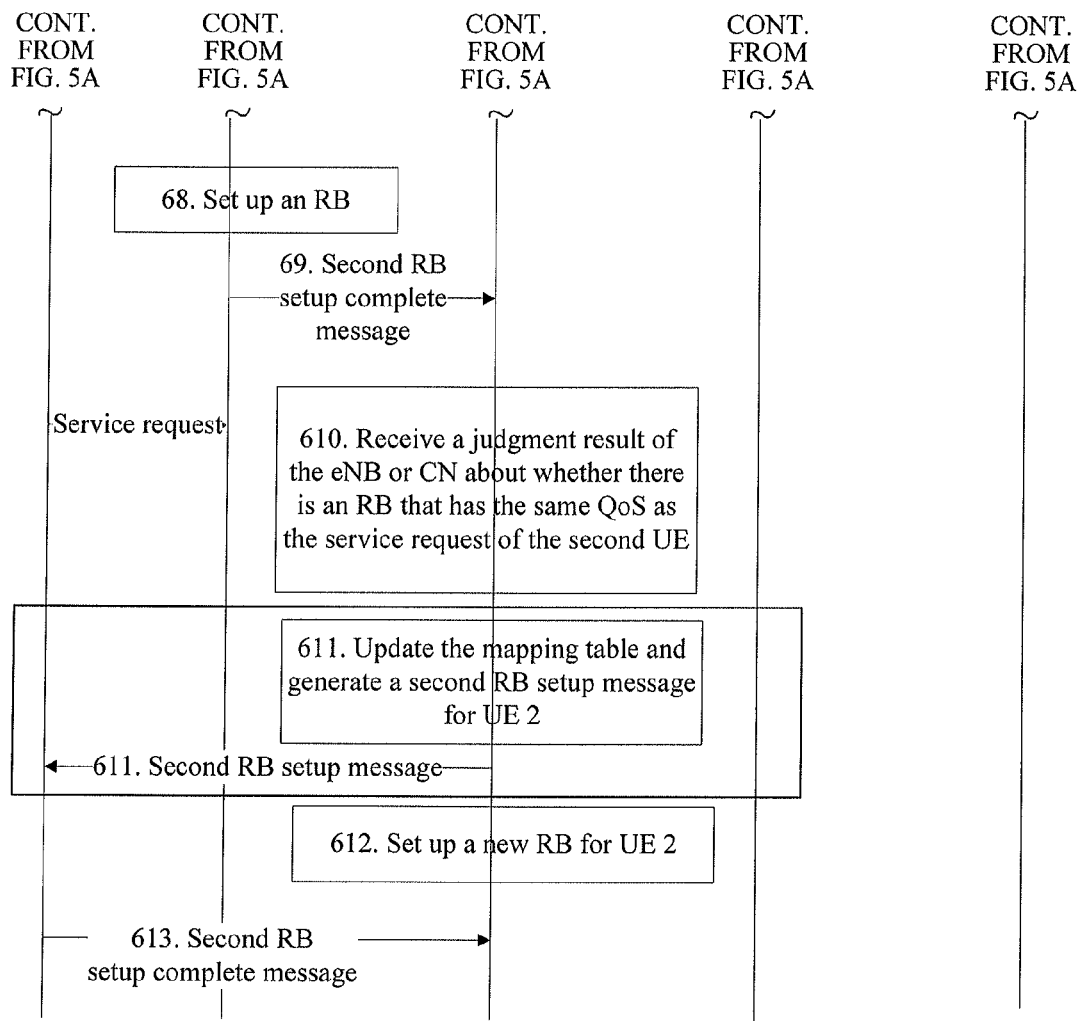

As shown in FIG. 5A~FIG. 5B, a method provided by the fifth embodiment of the present invention includes the following steps:

Step 61: A UE sends a service request to a CN via an RS and an eNB.

The implementation of this step is the same as that in step 21 in the second embodiment of the present invention.

Step 62: The eNB generates a first RB setup message according to the service request.

Step 63: The eNB sends the first RB setup message to the RS, where the message includes RB configuration information, for example, configuration parameters such as the UE, the RS, the CN, the RB, a transport channel, a physical channel, and a radio resource.

In the embodiment of the present invention, the first RB setup message is specifically a combined RB setup message.

Step 64: The RS sets up a combined RB with the eNB according to the first RB setup message. This means that the combined RB is able to bear the same service of multiple UEs so that the RB on a relay link remains unchanged in a certain period of time. The RS also creates a mapping table between the RB and the RB on an access link.

Step 65: The RS generates a second RB setup message according to the mapping table.

Step 66: The RS sends a first RB setup complete message to the eNB according to the first RB setup message.

Step 67: The RS sends the second RB setup message to the UE, notifying the UE to set up an RB.

Step 68: The UE sets up an RB according to the second RB setup message.

Step 69: The RS receives a second RB setup complete message sent by the UE.

Step 610: After receiving a service request of a second UE (UE 2), the RS receives a judgment result of the eNB or CN regarding whether there is already an RB that has the same QoS as an RB which is set up according to the service request of the second UE and performs processing accordingly. If there is an RB that has the same QoS as the RB which is set up according to the service request of the second UE, step 611 is executed; or if there is no RB that has the same QoS as the service request of the second UE, step 612 is executed.

In this step, if the CN judges whether there is already an RB that has the same QoS as the RB which is set up according to the service request of the second UE, the CN sends the judgment result to the eNB. Then the eNB sends the judgment result to the RS according to the judgment result of the CN or the judgment result of the eNB (not shown in FIG. 5).

Step 611: The RS updates the mapping table, generates a second RB setup message for the second UE, and sends the message to the second UE. This means that an RB that is already set up on the relay link can be used for the service request of the second UE.

Step 612: A new RB is set up for the second UE. That is, the above process is repeated.

Step 613: The RS receives a second RB setup complete message sent by the second UE.

Step 66 may be executed after step 64 or step 69.

In the fifth embodiment of the present invention, according to the service request of the UE, the RS first sets up a combined RB that bears the same service of multiple UEs; when a new UE initiates a service request, if the service request of the new UE is the same as the service request of the current UE, the created mapping table is updated directly so that the existing RB of the same service is used without a new RB created on the relay link. Otherwise, a new RB is set up for the new UE. In this way, the efficiency of setting up RBs for UEs is increased.

Figure 6:
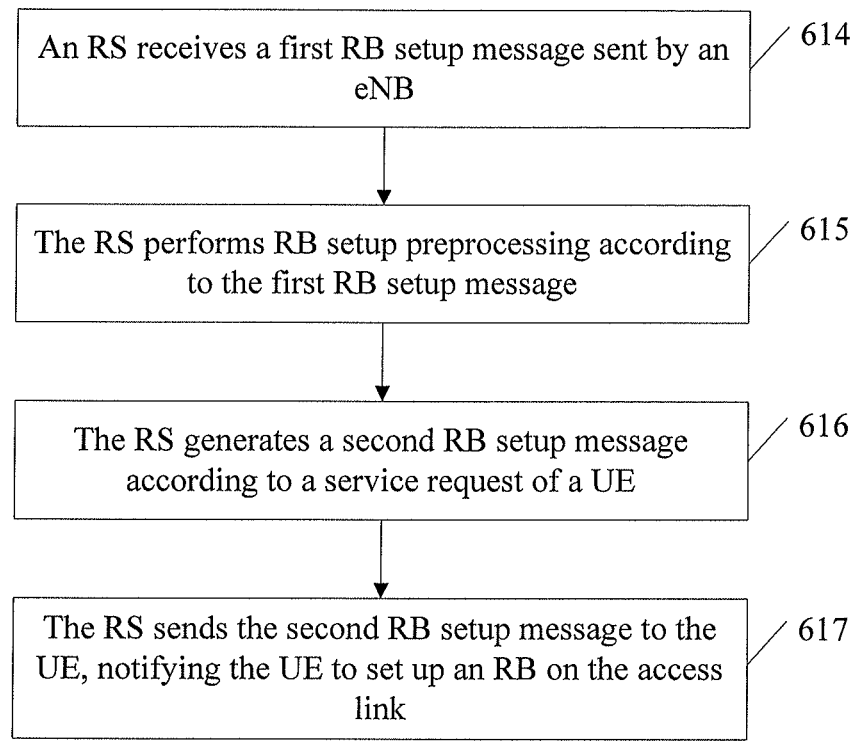
FIG. 6 is a flowchart of a method for setting up an RB according to a sixth embodiment of the present invention.

FIG. 6 illustrates another method for setting up an RB according to the sixth embodiment of the present invention. The method includes the following steps:

Step 614: An RS receives a first RB setup message sent by an eNB.

Step 615: The RS performs RB setup preprocessing according to the first RB setup message.

Step 616: The RS generates a second RB setup message according to a service request of a UE.

Step 617: The RS sends the second RB setup message to the UE, notifying the UE to set up an RB.

In the embodiment of the present invention, step 614 and step 615 must be completed once before step 616 and step

617. However, when another UE initiates a service request, step 614 and step 615 may be executed without step 614 and step 615.

Or, when step 616 and step 617 are repeated, step 614 and step 615 are executed once again.

In the embodiment of the present invention, an RB on a relay link between the RS and the eNB is first set up. This RB is one with large bandwidth based on a primary service. Afterwards, when a UE initiates a service request, it is only necessary to judge whether there is an RB of the same service on the relay link. If such an RB exists, the RB of the same service on the relay link is used directly and it is only necessary to set up a new RB on an access link. If no such RB exists, a new RB with large bandwidth needs to be set up on the relay link and then an RB is set up on the access link.

From the above description, it is apparent that, in the technical solution of the sixth embodiment of the present invention, when an RS exists in the system, the RS performs RB setup preprocessing according to a first RB setup message sent by the eNB, and generates a second RB setup message according to the service request of a UE and sends the message to the UE, so that the UE can set up an RB according to the second RB setup message. Therefore, after the RS is introduced, an end-to-end RB can be set up between the eNB and the UE with the technical solution of the embodiment of the present invention. Moreover, because an RB is already set up on the relay link, when a UE initiates a service request, it is unnecessary to set up a new RB on the relay link. In this way, signaling overhead is reduced and network resources are saved.

Figure 7:
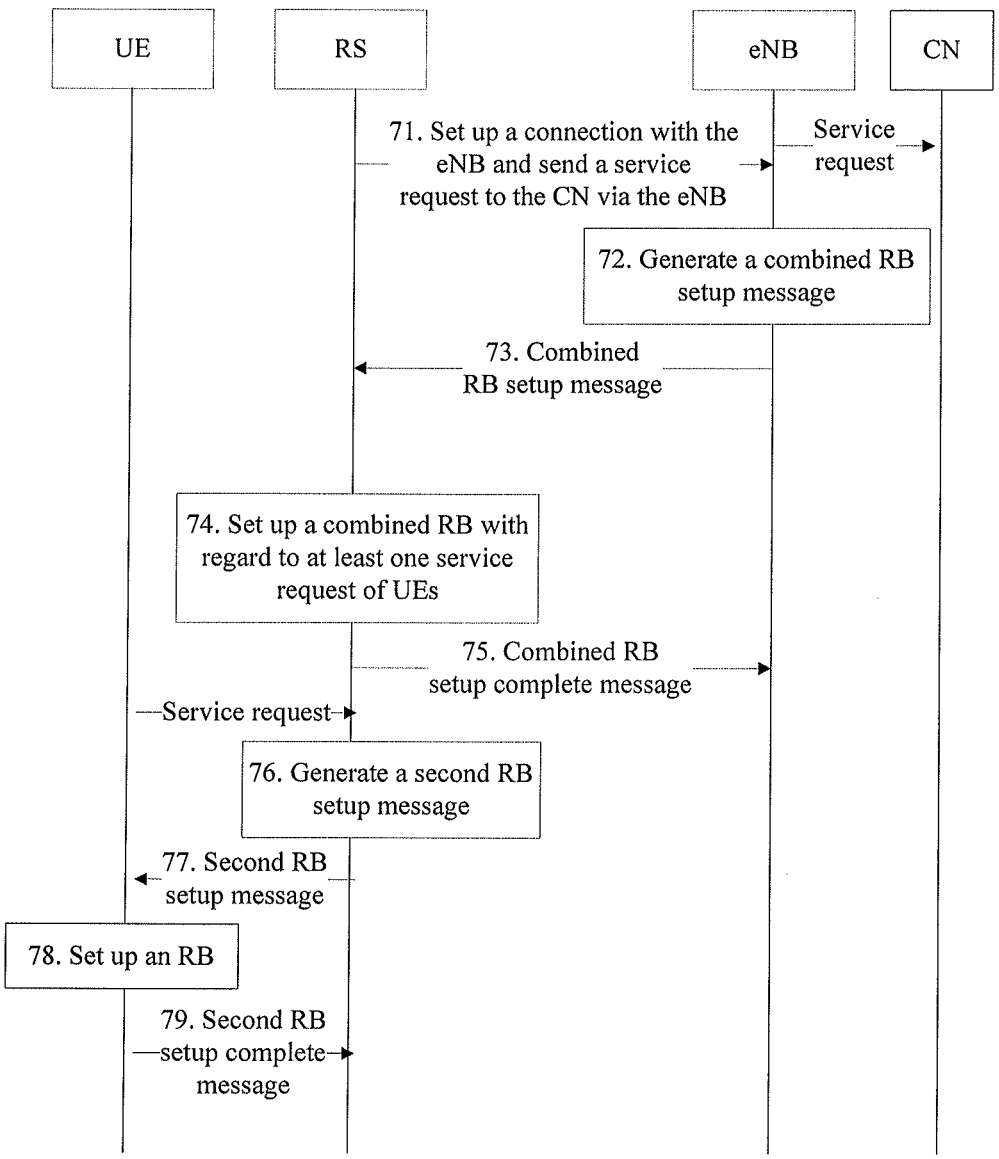
FIG. 7 is a flowchart of a method for setting up an RB according to a seventh embodiment of the present invention.

As shown in FIG. 7, a method provided by the seventh embodiment of the present invention includes the following steps:

Step 71: An RS sets up a connection with an eNB and sends a service request to a CN via the eNB, requesting to set up an RB with the eNB.

Step 72: The eNB generates a combined RB setup message according to the service request.

Step 73: The eNB sends the combined RB setup message to the RS, where the message includes RB configuration information, for example, configuration parameters such as the UE, the RS, the CN, the RB, a transport channel, a physical channel, and a radio resource.

Step 74: The RS sets up a combined RB with regard to at least one service request of UEs with the eNB according to the combined RB setup message. This means that the combined RB is able to bear the same service of multiple UEs so that the RB on a relay link remains unchanged in a certain period of time.

Step 75: The RS sends a combined RB setup complete message to the eNB.

Step 76: The RS generates a second RB setup message. Specifically, the RS performs the following processing according to a judgment result received from the eNB or CN about whether there is a combined RB that has the same QoS as the RB which is set up according to the service request of the UE:

If such a combined RB exists, the RS updates a mapping table between the existing combined RB and RBs on an access link and generates a second RB setup message for the UE. The updating of the mapping table is specifically creating a mapping table between the combined RB and RBs on the access link and adding the ID of the UE to the mapping table. If no such combined RB exists, the RS sets up a combined RB for the new UE.

In this step, if the CN judges whether there is already an RB that has the same QoS as the RB which is set up according to the service request of the second UE, the CN sends the judgment result to the eNB. Then the eNB sends the judgment result to the RS according to the judgment result of the CN or the judgment result of the eNB (not shown in FIG. 7).

Step 77: The RS sends the second RB setup message to the UE according to the mapping table.

Step 78: The UE sets up an RB according to the second RB setup message.

Step 79: The RS receives a second RB setup complete message sent by the UE.

Step 75 may be executed after step 74 or step 79.

Further, when another UE initiates a service request, the eNB or CN judges whether on the relay link there is already a combined RB that bears the same service as the service request. If such a combined RB exists, the eNB sends a first RB setup message to the RS, so that the RS and the eNB use the existing RB on the relay link that bears the same service as the service request and that the RS modifies the related mapping table. If no such combined RB exists, the eNB sends a first RB setup message to the RS, so that the RS and the eNB set up a new combined RB with regard to the service request and that the RS creates a new mapping table.

From the above description, it is apparent that, when an RS exists in the system, the RS performs RB setup preprocessing according to a first RB setup message received from the eNB and generates a second RB setup message according to the preprocessing result, so that the UE sets up an RB according to the second RB setup message. Therefore, after the RS is introduced, an end-to-end RB can be set up between the eNB and the UE with the technical solution of the embodiment of the present invention.

Those skilled in the art understand that all or part of the steps of the methods according to the foregoing embodiments of the present invention may be implemented by hardware under the instruction of a computer program. The program is stored in a computer readable storage medium and when the program is executed, the steps of the methods according to the foregoing embodiments of the present invention are executed. The storage medium may be a magnetic disk, a compact disk-read only memory (CD-ROM), a read only memory (ROM), or a random access memory (RAM).

Figure 8:
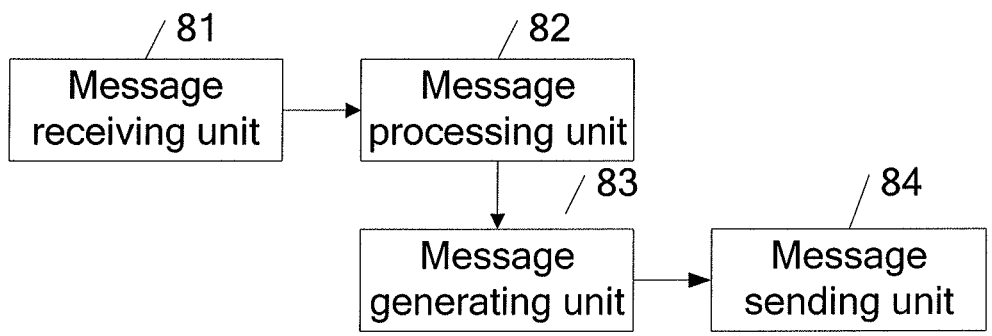
FIG. 8 is a schematic diagram of an RS according to an eighth embodiment of the present invention.

In addition, the eighth embodiment of the present invention provides an RS. As shown in FIG. 8, the RS includes:

a message receiving unit 81, configured to receive a first RB setup message from an eNB;

a message processing unit 82, configured to perform RB setup preprocessing according to the received first RB setup message;

a message generating unit 83, configured to generate a second RB setup message according to a result of the RB setup preprocessing; and a message sending unit 84, configured to send the second RB setup message to a UE, notifying the UE to set up an RB on an access link.

The message receiving unit 81 is further configured to receive a second RB setup complete message sent by the UE according to the second RB setup message; and the message sending unit 84 is further configured to send a first RB setup complete message to the eNB according to the first RB setup message.

From the above description, it is apparent that, with the RS of the eighth embodiment of the present invention, when an RS exists in the system, the apparatus performs RB setup preprocessing according to a first RB setup message received by the message receiving unit, and generates a second RB setup message according to the preprocessing result, so that the UE sets up an RB according to the second RB setup message. Therefore, after the RS is introduced, an end-to-end RB can be set up between the eNB and the UE with the technical solution of the embodiment of the present invention.

Figure 9:
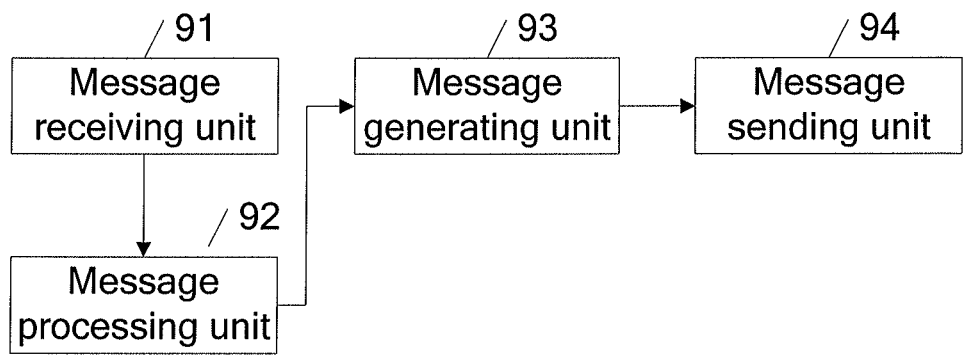
FIG. 9 is a schematic diagram of an RS according to a ninth embodiment of the present invention.

The ninth embodiment of the present invention provides an RS. As shown in FIG. 9, the RS includes:

a message receiving unit 91, configured to receive a first RB setup message from an eNB;

a message processing unit 92, configured to perform RB setup preprocessing according to the received first RB setup message;

a message generating unit 93, configured to generate a second RB setup message according to a result of the RB setup preprocessing; and a message sending unit 94, configured to send the second RB setup message to a UE, notifying the UE to set up an RB on an access link.

In the embodiment of the present invention, at least the following two circumstances may be differentiated:

In the first circumstance, if a CN or the eNB determines that there is no RB that bears the same service as an RB which is set up according to a service request of the UE, when the first RB setup message includes a request for setting up an RB for one UE, the message processing unit 92 includes:

an RB setup module, configured to set up an RB on a relay link with the eNB according to the first RB setup message; and a mapping table creating module, configured to create a mapping table between the RB on the relay link and the RB on the access link according to the information carried in the first RB setup message.

In this case, the message receiving unit 91 is further configured to receive a second RB setup complete message sent by the UE according to the second RB setup message; and the message sending unit 94 is further configured to send a first RB setup complete message to the eNB according to the first RB setup message.

Or, if the CN or the eNB determines that there is no RB that bears the same service as the RB which is set up according to the service request of the UE, when the first RB setup message includes a request for setting up RBs for at least two UEs, the message processing unit 92 includes:

an RB setup module, configured to set up a combined RB on the relay link with the eNB according to a combined RB setup message; and a mapping table creating module, configured to divide, according to the information included in the combined RB setup message, resources allocated to the UEs and create a mapping table between the combined RB and RBs on the access link.

In this case, the message receiving unit 91 is further configured to receive a second RB setup complete message sent by the UE according to the second RB setup message; and the message sending unit 94 is further configured to send a combined RB setup complete message to the eNB according to the combined RB setup message.

In the second circumstance, when the eNB or CN determines that there is an RB that bears the same service as an which is RB set up according to the service request of the UE, the first RB setup message is specifically a combined RB setup reconfiguration message and the message processing unit 92 includes a mapping table updating module, configured to modify configuration parameters according to the combined RB setup reconfiguration message and update the mapping table between the RB on the relay link and the RB on the access link.

In this case, the message receiving unit 91 is further configured to receive a second RB setup complete message sent by the UE according the second RB setup message; and the message sending unit 94 is further configured to send a combined RB setup reconfiguration complete message to the eNB according to the combined RB setup reconfiguration message.

From the above description, it is apparent that, when the RS is introduced, an end-to-end RB can be set up between the eNB and the UE with the technical solution of the ninth embodiment of the present invention.

Figure 10:
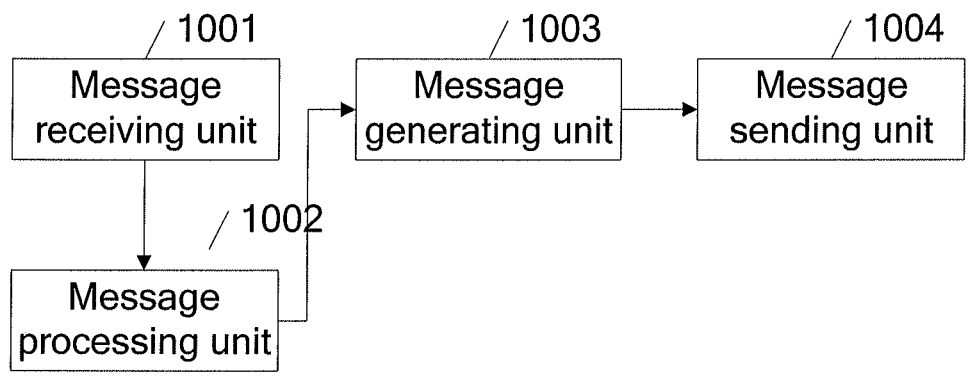
FIG. 10 is a schematic diagram of an RS according to a tenth embodiment of the present invention.

The tenth embodiment of the present invention provides an RS. As shown in FIG. 10, the RS includes:

a message receiving unit 1001, configured to receive a first RB setup message from an eNB;

a message processing unit 1002, configured to perform RB setup preprocessing according to the received first RB setup message;

a message generating unit 1003, configured to generate a second RB setup message according to a result of the RB setup preprocessing; and a message sending unit 1004, configured to send the second RB setup message to a UE, notifying the UE to set up an RB.

The message processing unit 1002 may include:

an RB setup module, configured to set up a combined RB with regard to at least one service request of UEs with the eNB according to the first RB setup message; and a mapping table creating module, configured to create a mapping table between the combined RB and RBs on an access link.

In this case, the message receiving unit 1001 is further configured to receive a second RB setup complete message sent by the UE according to the second RB setup message; and the message sending unit 1004 is further configured to send a first RB setup complete message to the eNB according to the first RB setup message.

When a new UE initiates a service request, the RS may further include:

a first processing unit, configured to: when the eNB or CN determines that there is an RB that bears the same service as an RB which is set up according to the service request of the second UE, update the created mapping table between the combined RB and RBs on the access link and generate a second RB setup message for the second UE; and a second processing unit, configured to: when the eNB or CN determines that there is no RB that bears the same service as the RB which is set up according to the service request of the second UE, create a new combined RB for the second UE.

In this case, the message sending unit 1004 is further configured to send a second RB setup message to the second UE; and the message receiving unit 1001 is further configured to receive a second RB setup complete message sent by the second UE according to the second RB setup message.

From the above description, it is apparent that, when the RS is introduced, an end-to-end RB can be set up between the eNB and the UE with the technical solution of the tenth embodiment of the present invention.

Figure 11:
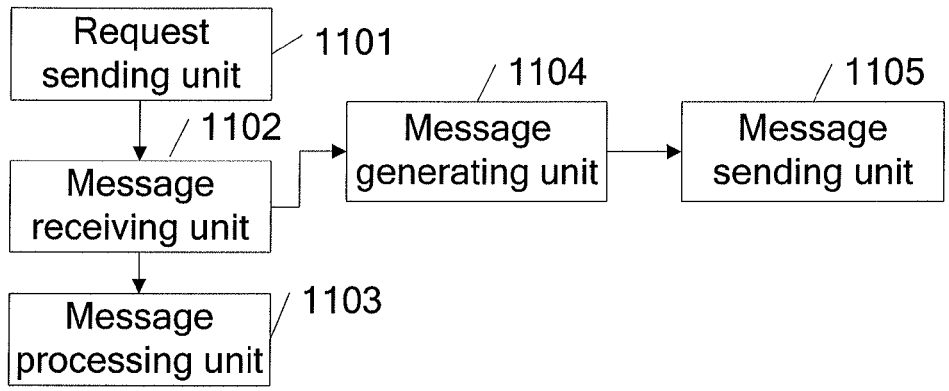
FIG. 11 is a schematic diagram of an RS according to an eleventh embodiment of the present invention.

The eleventh embodiment of the present invention provides an RS. As shown in FIG. 11, the RS includes:

a request sending unit 1101, configured to set up a connection with an eNB and send a service request to a CN via the eNB;

a message receiving unit 1102, configured to receive a first RB setup message from the eNB;

a message processing unit 1103, configured to perform RB setup preprocessing according to a service request of a UE;

a message generating unit 1104, configured to generate a second RB setup message; and a message sending unit 1105, configured to send the second RB setup message to the corresponding UE, notifying the UE to set up an RB on an access link.

The message processing unit 1103 includes:

a combined RB setup module, configured to set up a combined RB with regard to at least one service request of UEs with the eNB according to a combined RB setup message.

The message generating unit 1104 includes:

a first processing module, configured to: when the eNB or CN determines that there is an RB that bears the same service as an RB which is set up according to the service request of the UE, update a mapping table between the combined RB and the RB on the access link and generate a second RB setup message for the UE; and a second processing module, configured to: when the eNB or CN determines that there is no RB that bears the same service as the RB which is set up according to the service request of the UE, create a new combined RB for the UE.

In the embodiment of the present invention, the message receiving unit 1102 is further configured to receive a second RB setup complete message sent by the UE; and the message sending unit 1105 is further configured to send a combined RB setup reconfiguration complete message to the eNB.

From the above description, it is apparent that, when the RS is introduced, an end-to-end RB can be set up between the eNB and the UE with the technical solution of the eleventh embodiment of the present invention.

Figure 12:
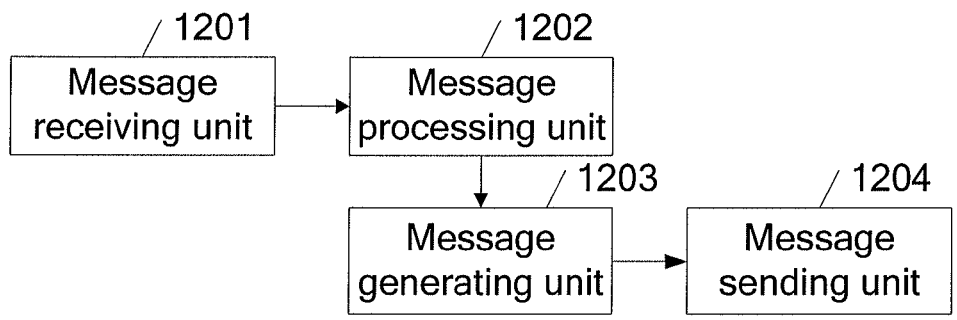
FIG. 12 is a schematic diagram of an RS according to a twelfth embodiment of the present invention.

In addition, the twelfth embodiment of the present invention provides an RS. As shown in FIG. 12, the RS includes:

a message receiving unit 1201, configured to receive a first RB setup message from an eNB;

a message processing unit 1202, configured to perform RB setup preprocessing according to the received first RB setup message;

a message generating unit 1203, configured to generate a second RB setup message according to a result of the RB setup preprocessing; and a message sending unit 1204, configured to send the second RB setup message to a UE, notifying the UE to set up an RB.

When the first RB setup message includes a request for setting up RBs for at least two UEs, the first RB setup message is a combined RB setup message sent by the eNB, when the eNB or CN determines that the service requests initiated by the at least two UEs in a period of time are the same, and the message processing unit 1202 includes: an RB setup module, configured to set up a combined RB with the eNB according to the combined RB setup message; and a mapping table creating module, configured to divide, according to the information carried in the combined RB setup message, resources allocated to the UEs and create a mapping table between the combined RB and RBs on an access link.

In this case, the message sending unit is further configured to send a combined RB setup complete message to the eNB. The message receiving unit is further configured to receive a second RB setup complete message sent by the UEs.

If the first RB setup message includes a request for setting up an RB for one UE, the first RB setup message is an RB setup message respectively sent by the eNB to each of the UEs, when the eNB or CN determines that the service requests initiated by at least two UEs in a period of time are different, and the message processing unit 1202 includes:

an RB setup module, configured to set up an RB with the eNB according to the first RB setup message generated by the eNB for the UE.

In this case, the message sending unit is further configured to send a first RB setup complete message to the eNB. The message receiving unit is further configured to receive a second RB setup complete message sent by the UE.

From the above description, it is apparent that, when the RS is introduced, an end-to-end RB can be set up between the eNB and the UE with the technical solution of the twelfth embodiment of the present invention.

Figure 13:
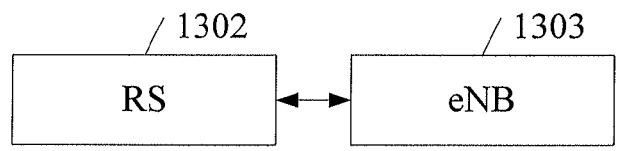
FIG. 13 is a schematic diagram of a system for setting up an RB according to a thirteenth embodiment of the present invention.

The thirteenth embodiment of the present invention provides a system for setting up an RB. As shown in FIG. 13, the system includes an RS 1302 and an eNB 1303.

The eNB 1303 is configured to send a first RB setup message to the RS 1302 according to a service request of a UE.

The RS 1302 is configured to: perform RB setup preprocessing according to the first RB setup message and generate a second RB setup message according to the first RB setup message; and send the second RB setup message to the UE, notifying the UE to set up an RB on an access link.

From the above description, it is apparent that, when an RS is introduced, an end-to-end RB can be set up between the eNB and the UE with the technical solution of the thirteenth embodiment of the present invention.

Figure 14:
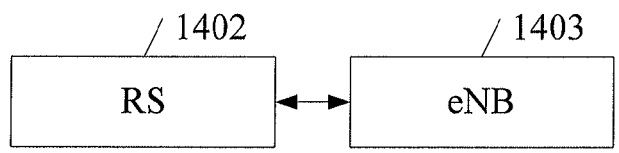
FIG. 14 is a schematic diagram of a system for setting up an RB according to a fourteenth embodiment of the present invention.

The fourteenth embodiment of the present invention provides a system for setting up an RB. As shown in FIG. 14, the system includes an RS 1402 and an eNB 1403.

The RS 1402 is configured to: send a service request to the eNB 1403 and receive a first RB setup message sent by the eNB 1403; perform RB setup preprocessing according to the first RB setup message; generate a second RB setup message according to a service request of a UE; and send the second RB setup message to the UE, notifying the UE to set up an RB on an access link.

The eNB 1403 is configured to generate the first RB setup message according to the service request of the RS and send the first RB setup message to the RS.

From the above description, it is apparent that, when the RS is introduced, an end-to-end RB can be set up between the eNB and the UE with the technical solution of the fourteenth embodiment of the present invention.

Figure 15:
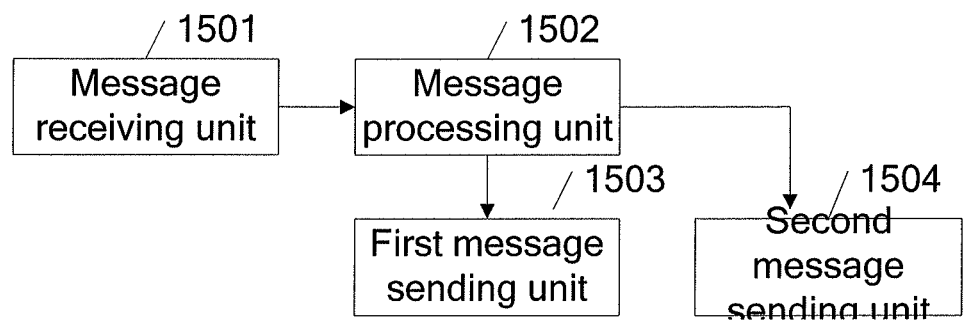
FIG. 15 is a schematic diagram of an eNB according to a fifteenth embodiment of the present invention.

The fifteenth embodiment of the present invention provides an eNB. As shown in FIG. 15, the eNB includes a message receiving unit 1501, a message processing unit 1502, a first message sending unit 1503, and a second message sending unit 1504.

The message receiving unit 1501 is configured to receive a service request initiated by a UE. The service request initiated by the UE may be forwarded by an RS to the eNB.

Further, the message receiving unit 1501 is configured to receive a judgment result of a CN about whether the service request initiated by the UE is the same as a service borne over an RB on a relay link.

The message processing unit 1502 is configured to: according to the service request received by the message receiving unit 1501, judge whether on the relay link there is already an RB or a combined RB that bears the same service as the service request; and if there is the RB or the combined RB, notify the first message sending unit 1503 to send a first RB setup message; or if there is no RB or combined RB, notify the second message sending unit 1504 to send a first RB setup message.

Further, the message processing unit 1502 may be configured to notify, according to the judgment result of the CN received by the message receiving unit 1501, the first message sending unit 1503 or the second message sending unit 1504 to send the first RB setup message. The specific implementation is provided in previous descriptions.

The first message sending unit 1503 is configured to send the first RB setup message, where the message is an RB setup reconfiguration message instructing the RS to reconfigure an existing RB according to the RB setup reconfiguration message; or the message is an indication message instructing the RS to use an existing RB for the service request of the UE and update a mapping table.

The second message sending unit 1504 is configured to send the first RB setup message, where the message is an RB setup message or a combined RB setup message instructing the RS to set up a new RB or new combined RB for the service request of the UE according to the message.

Through the eNB provided by the fifteenth embodiment of the present invention, it may be judged whether the service required by the service request of the UE is the same as a service borne over an existing RB and modify or use the existing RB, therefore reducing signaling overhead and saving network resources.

To sum up, with the method, apparatus, and system provided by the embodiments of the present invention, when an RS exists in the system, the RS performs RB setup preprocessing according to a first RB setup message sent by an eNB and generates a second RB setup message according to the preprocessing result, and sends the second RB setup message to a UE, so that the UE sets up an RB according to the second RB setup message. Therefore, after the RS is introduced, an end-to-end RB can be set up between the eNB and the UE with the technical solutions of the embodiments of the present invention.

Although the present invention has been described in detail through some exemplary embodiments, the present invention is not limited to such embodiments. Any modification or substitution readily conceivable by those skilled in the art within the scope of technical disclosure of the present invention shall be covered within the protection scope of the present invention. Therefore, the protection scope of the present invention is subject to the appended claims.

What is claimed is:

1. A method for setting up a Radio Bearer (RB), comprising:
    receiving a first RB setup message sent by an evolved NodeB (eNB);
    setting up, according to the first RB setup message, a first combined RB with the eNB with regard to a service request initiated by a first User Equipment (UE), when on a relay link there is no RB that bears a same service as an RB which is set up according to the service request initiated by the first UE;
    creating a mapping table between the first combined RB and RBs on an access link;
    generating a second RB setup message for the first UE;
    sending, according to the mapping table, the second RB setup message to the first UE, notifying the first UE to set up an RB on the access link;
    updating the mapping table when a third RB setup message is sent by the eNB when the eNB or a Core Network (CN) determines that a service required by a service request initiated by a second UE is the same as a service of the first combined RB;
    generating a fourth RB setup message for the second UE; and
    sending, according to the updated mapping table, the fourth RB setup message to the second UE, notifying the second UE to set up an RB on the access link.

2. The method according to claim 1, further comprising:
    setting up a second combined RB with the eNB with regard to the service request initiated by the second UE, if the third RB setup message is sent by the eNB when the eNB or the CN determines that the service required by the second UE is different from the service of the first combined RB; and
    creating a second mapping table between the second combined RB and RBs on the access link according to the third RB setup message.

3. The method according to claim 1, wherein after creating the mapping table between the first combined RB and RBs on the access link or generating the second RB setup message for the first UE, the method further comprises:
    sending a first RB setup complete message to the eNB according to the first RB setup message.

4. The method according to claim 1, wherein after sending the second RB setup message to the first UE, the method further comprises:
    receiving a second RB setup complete message sent by the first UE according to the second RB setup message.

5. A Relay Station (RS), comprising:
    a message receiving unit, configured to receive a first RB setup message sent by an evolved NodeB (eNB);
    a RB setup module, configured to set up according to the first RB setup message a first combined RB with the eNB with regard to a service request initiated by a first User Equipment (UE), when on a relay link there is no RB that bears the same service as an RB which is set up according to a service request initiated by the first UE;
    a mapping table creating module, configured to create a mapping table between the first combined RB and RBs on an access link;
    a message generating unit, configured to generate a second RB setup message for the first UE; and
    a message sending unit, configured to send according to the mapping table the second RB setup message to the first UE, notifying the first UE to set up an RB on the access link;
    wherein, when a third RB setup message is sent by the eNB when the eNB or a Core Network (CN) determines that a service required by a service request initiated by a second UE is the same as a service of the first combined RB, the mapping table creating module is further configured to update the mapping table, the message generating unit is further configured to generate a fourth RB setup message for the second UE, and the message sending unit is further configured to send according to the updated mapping table the fourth RB setup message to the second UE notifying the second UE to set up an RB on the access link.

6. The RS according to claim 5, wherein if the third RB setup message is sent by the eNB when the eNB or the CN determines that the service required by the second UE is different from the service of the first combined RB, the RB setup module is further configured to set up a second combined RB with the eNB with regard to the service request initiated by the second UE, and the mapping table creating module is further configured to create a second mapping table between the second combined RB and RBs on the access link according to the third RB setup message.

7. The RS according to claim 5, wherein the message sending unit is further configured to send a first RB setup complete message to the eNB according to the first RB setup message.

8. The RS according to claim 5, wherein the message receiving unit is further configured to receive a second RB setup complete message sent by the first UE according to the second RB setup message.

* * * * *